United States Patent [19]
Watanabe et al.

[11] Patent Number: 5,859,677
[45] Date of Patent: Jan. 12, 1999

[54] ACTIVE MATRIX LIQUID CRYSTAL DISPLAY DEVICE WITH INDEPENDENT POTENTIALS APPLIED TO THE OPPOSING ELECTRODE AND THE TRANSISTOR SIDE CONDUCTIVE LIGHT SHIELDING FILM

[75] Inventors: Makoto Watanabe; Koji Nakashima; Osamu Sukegawa, all of Tokyo, Japan

[73] Assignee: NEC Corporation, Tokyo, Japan

[21] Appl. No.: 594,169

[22] Filed: Jan. 31, 1996

[30] Foreign Application Priority Data

Jan. 31, 1995 [JP] Japan ................................ 7-036235

[51] Int. Cl.$^6$ .................................................... G02F 1/1343
[52] U.S. Cl. ................................ 349/38; 349/39; 345/92
[58] Field of Search .............................. 349/38, 39, 43, 349/44, 46, 112; 345/92

[56] References Cited

U.S. PATENT DOCUMENTS

| | | | |
|---|---|---|---|
| 4,687,298 | 8/1987 | Aoki et al. | 349/44 |
| 4,821,092 | 4/1989 | Noguchi | 349/43 |
| 5,028,122 | 7/1991 | Hamada et al. | 349/38 |
| 5,339,181 | 8/1994 | Kim et al. | 349/38 |
| 5,461,501 | 10/1995 | Sato et al. | 349/39 |
| 5,657,101 | 8/1997 | Cheng | 349/42 |

FOREIGN PATENT DOCUMENTS

| | | |
|---|---|---|
| 0136509 | 4/1985 | European Pat. Off. . |
| 0556484 | 8/1993 | European Pat. Off. . |
| 0592063 | 4/1994 | European Pat. Off. . |
| 60-192370 | 9/1985 | Japan . |
| 3-42124 | 4/1991 | Japan . |

OTHER PUBLICATIONS

Patent Abstracts of Japan, vol. 11, No. 376 (E–563), Dec. 8, 1987.

Primary Examiner—William L. Sikes
Assistant Examiner—Kenneth Parker
Attorney, Agent, or Firm—Sughrue, Mion, Zinn, Macpeak & Seas, PLLC

[57] ABSTRACT

The active matrix type liquid crystal display device has a plurality of liquid crystal elements. Each liquid crystal element has a transistor section, a transistor side conductive light shielding film electrically connected to the transistor section, and a liquid crystal element having an opposing electrode coupled to the transistor section. There are a first potential terminal connected to the opposing electrode and a second potential terminal connected to the transistor side conductive light shielding film with a potential applied by the first potential terminal being independent from a potential applied by the second potential terminal. With this arrangement, the lateral field components around the pixel portion, which become a cause for the reverse tilt of the liquid crystal, are relatively reduced with respect to the vertical field components, thus reducing the disclination and providing excellent display characteristics without residual images.

4 Claims, 17 Drawing Sheets

ACTIVE MATRIX LIQUID CRYSTAL DISPLAY DEVICE WITH INDEPENDENT POTENTIALS APPLIED TO THE OPPOSING ELECTRODE AND THE TRANSISTOR SIDE CONDUCTIVE LIGHT SHIELDING FILM

BACKGROUND OF THE INVENTION (1) Field of the Invention

The present invention relates to a liquid crystal display device using an amorphous silicon thin film transistor (TFT), and more particularly to a high-definition liquid crystal display device having a conductive light shielding film at a transistor substrate side.

(2) Description of the Related Art

A liquid crystal display device of the kind to which the present invention relates is proposed in, for example, Japanese Patent Application Kokai Publication No. Hei 3-50527. The proposal relates to a thin film transistor array substrate comprising a light shielding film provided on a glass substrate and having an open portion (an aperture) at a pixel electrode formation region, an interlayer insulating film provided on a surface including the light shielding film, a thin film transistor provided on the interlayer insulating film on the light shielding film, and a display electrode provided on the interlayer insulating film so as to be connected with the thin film transistor and be in alignment with the open portion. The light shielding of the TFT region other than the pixel electrode formation region is effected by the light shielding film provided on the glass substrate, and this light shielding suppresses an increase in the TFT off-current caused by back light irradiation, and shields the leakage light from outside the pixel electrode.

The above prior art thin film transistor array substrate is shown in FIGS. 1, 2 and 3, FIG. 1 being a plan view of a unit pixel, FIG. 2 being a sectional view taken along line 2—2 of FIG. 1, and FIG. 3 being a sectional view taken along line 3—3 in FIG. 1.

In FIG. 1, the numeral 1 is for a gate electrode, 2 is for a semiconductor layer, 3 is for a drain electrode, 4 is for a source electrode, 5 is for a pixel electrode, 7 is for an end of a TFT side conductive light shielding film, 6 is for an open portion, 11 is for a scanning signal line, and 12 and 13 are for image signal lines. The unit pixel is formed at a region surrounded by the scanning signal line 11 and the image signal lines 12 and 13. The electrical connection is established between the gate electrode 1 of the TFT and the scanning signal line 11, between the drain electrode and the image signal line 12, and between the source electrode 4 and the pixel electrode 5, and the conductive light shielding film having the open portion 6 is provided at the pixel electrode formation region on the glass substrate.

The structure shown in FIGS. 2 and 3 are formed by depositing a Cr film on a glass substrate 100 by a sputtering process, and the portion of the Cr film that corresponds to the pixel electrode formation region is selectively etched so as to form an opening, thus forming the light shielding film 116. Then, a nitride silicon film is deposited on a surface including the light shielding film 116 by a CVD process, thus forming a light shielding layer insulating film 114.

Next, a Cr film is deposited on the light shielding layer insulating film 114, and this is selectively etched so as to form a gate electrode 111 on the light shielding film 116. Thereafter, a nitride silicon film is deposited on a surface including the gate electrode 111 thereby forming a gate insulating film 115.

On the gate insulating film 115 corresponding to the gate electrode 111, there are selectively formed an amorphous silicon film 119 and an n⁺ type amorphous silicon layer 119a provided on a surface of the amorphous silicon film and, on the gate insulating film 115 over an open portion of the light shielding film 116, a pixel electrode 105 is formed with the ITO film being selectively provided. Here, the pixel electrode 105 is provided so as to partly overlap peripheral portions of the opening of the light shielding film 116.

Next, a Cr film is deposited on a surface including the amorphous silicon film 119, and the resulting film is selectively etched whereby a drain electrode 113 and a source electrode 118 are formed.

Using the source/drain electrodes 118 and 113 as masks, the n⁺ type amorphous silicon layer 119a at a region corresponding to the gate electrode 111 is etched away, thus forming a thin film transistor array substrate. In the arrangement shown in FIG. 4, the light shielding film 116 and the opposing electrode 121 are of the same potential (=$V_{com}$) so that the charging capacitor is formed between the light shielding film 116 and the pixel electrode 105.

An equivalent circuit of one pixel in the prior art liquid crystal display device is shown in FIG. 5. The light shielding layer insulating film 114 and the gate insulating film 115 constitute a capacitor between the pixel electrode 5 and the light shielding film 116, and the same potential $V_{com}$ as for the light shielding film 116 is applied to the opposing electrode 121 which, together with the pixel electrode 105, sandwiches the liquid crystal 130.

In the above prior art example, no light shielding film is disposed on the TFT back channel so that there is a problem with regard to light shielding characteristics.

A thin film transistor array provided with a light shielding film on a back channel is disclosed, for example, in Japanese Patent Application Kokai Publication No. Sho 60-192370. In this example, a metal light shielding film on the back channel is coupled to either a first stage or a second stage of a gate line. A unit pixel of the thin film transistor array disclosed in the Japanese Patent Application Kokai Publication No. Sho 60-192370 is shown in a plan view in FIG. 6. FIG. 7 shows a sectional view taken along line 7—7 in FIG. 6, and FIG. 8 shows a sectional view taken along line 8—8 in FIG. 6.

In FIG. 6, the numeral 1 is for a gate line as a scanning signal line, 119 is for a semiconductor layer, 3 is for a drain electrode, 4 is for a source electrode, and 5 is for a pixel electrode.

In FIGS. 7 and 8, the numeral 100 is for a glass substrate, 1 is for a gate electrode, 3 is for a drain electrode, 4 is for a source electrode, 115 is for a gate insulating film, 144 is for a common electrode constituted by a transparent conductive layer, 145 is for an interlayer insulating film, 5 is for a pixel electrode, 117 is for a passivation insulating film, and 14 is for a conductive light shielding film on a TFT back channel.

As shown in FIG. 8, the conductive light shielding film 14 of a metal such as Cr on the TFT back channel is connected to a first stage gate electrode 1.

A thin film transistor in which a light shielding film on a back channel is connected to either a source electrode or a drain electrode is disclosed, for example, in Japanese Utility Model Application Kokai Publication No. Hei 3-42124. In this example, as shown in FIG. 9, a back channel side conductive light shielding film 14 formed of a metal is provided on a passivation insulating film 117 on a side opposite to the gate electrode 1ll with a semiconductor layer of an amorphous silicon film 119 and/or an n⁺ type amorphous silicon layer 119a being sandwiched therebetween, and the conductive light shielding film 14 is electrically coupled to a drain electrode 3 of the TFT.

In these example s disclosed in the above Japanese Patent Application Kokai Publication No. Sho 60-192370 and Japanese Utility Model Application Kokai Publication No. Hei 3-42124, the back channel side light shielding film fulfills also a role of a back gate, but the potential thereof changes with time and, moreover, cannot be provided as desired or selectively.

In each of the prior art liquid crystal display elements explained hereinabove, there is a trend that, when the element becomes highly defined, the lateral electric field between the pixel electrode and the TFT, the gate scanning line, and the image signal line, increases at the periphery of the pixel electrode (FIG. 4) and, as a consequence, the electric field which is expected to be in the vertical direction towards the liquid crystal between the pixel electrode and the opposing electrode is disturbed. For this reason, a disclination caused by a reverse tilt and a reverse twist of the liquid crystal is apt to occur around the pixel.

The light is constantly transmitted at portions where a disclination occurs, thereby degrading the quality of display. Also, the disclination causes the open portions to move, and this is observed by the user as a residual image.

SUMMARY OF THE INVENTION

An object of the invention, therefore, is to overcome the problems existing in the prior art, and to provide an active matrix type liquid crystal display device which is capable of suppressing the liquid crystal disclination that becomes a cause for coarse image appearance and residual image, and enhancing the quality of displayed image.

According to one aspect of the invention, there is provided an active matrix type liquid crystal display device having a plurality of liquid crystal elements, each of the liquid crystal elements comprising:

a transistor section having a gate electrode, a gate insulating film, a semiconductor film, a source electrode, a drain electrode, and a passivation insulating film;

a transistor side conductive light shielding film (116) electrically coupled to the transistor section and having an open portion;

a pixel electrode formed over the open portion of the transistor side conductive light shielding film and electrically connected to the source electrode of the transistor section;

a liquid crystal layer formed on the passivation insulating film;

an opposing electrode formed on the liquid crystal layer; and a means to apply to the transistor side conductive light shielding film a potential independent from a potential applied to the opposing electrode.

In the device according to the invention, an appropriate potential difference is provided, unlike in the prior art wherein the same potential is provided, between the opposing electrode and the transistor side conductive light shielding film so that, with respect to the vertical field components between the pixel electrode and the opposing electrode that are inherently required for the image display, the lateral field components around the pixel portion which become a cause for the reverse tilt of the liquid crystal are relatively reduced, thus reducing the disclination and providing excellent display characteristics without residual images.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
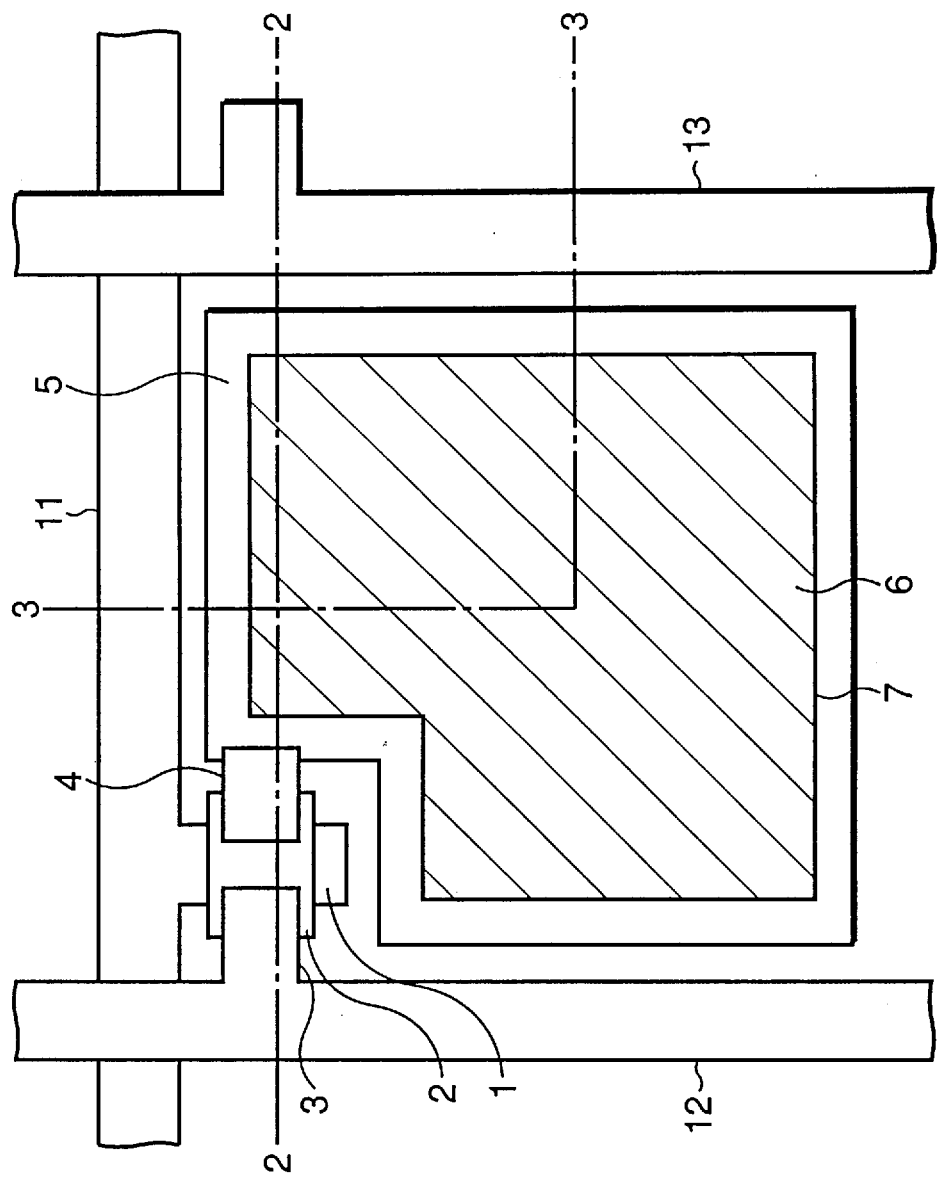
FIG. 1 is a plan view of a prior art unit pixel in a liquid crystal display device disclosed in Japanese Patent Application Kokai Publication No. Hei 3-50527.

Now, preferred embodiments of the invention are explained with reference to the drawings. Throughout the explanation, the same or similar symbols and reference numerals are used for the same or similar elements. Where an element has been explained in describing the prior art, the same explanation is not repeated and only a difference therefrom is explained.

A first embodiment of the invention is explained with reference to FIGS. 10–15.

Figure 10:
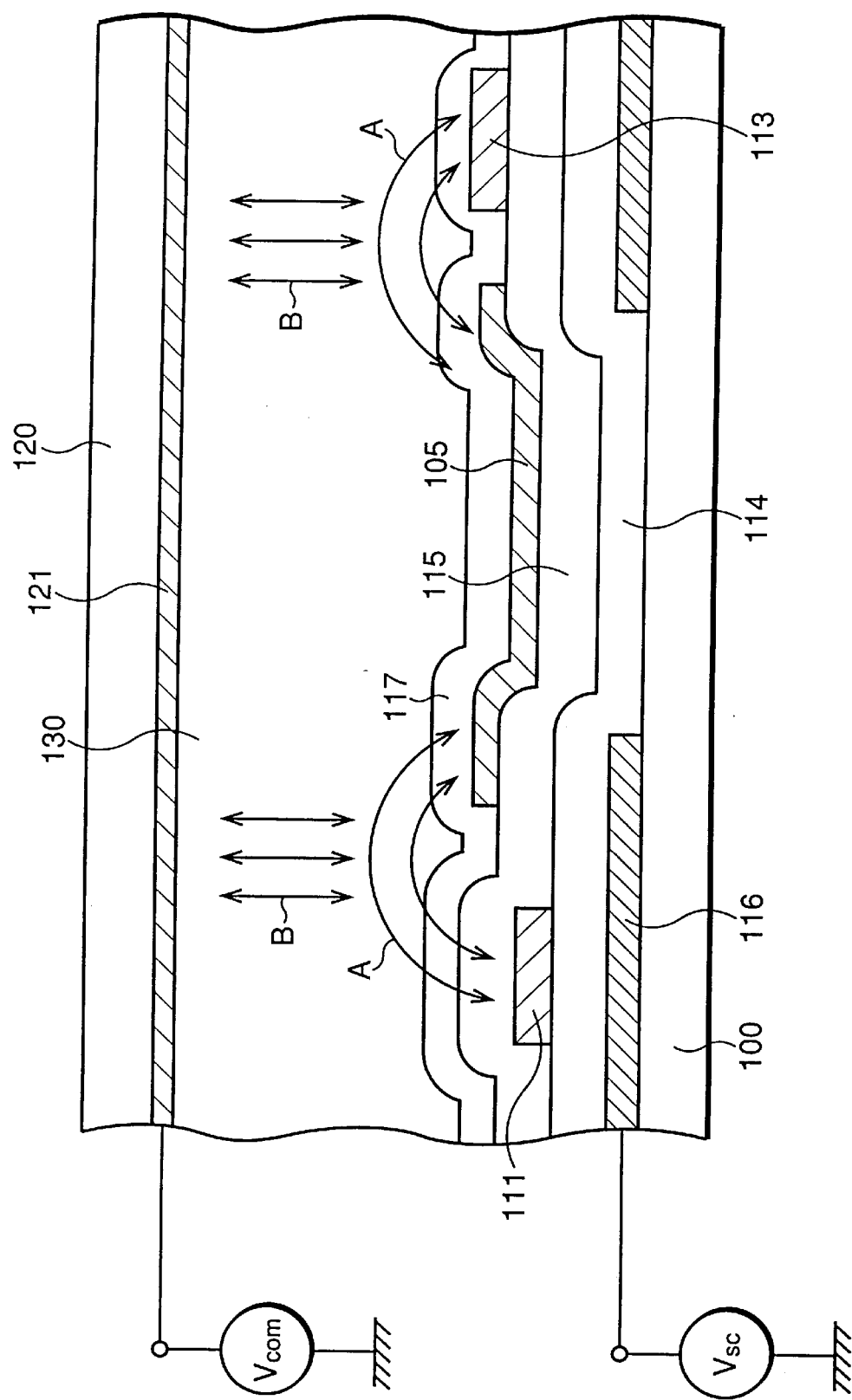
FIG. 10 is a sectional view of a unit pixel in a liquid crystal display device of a first embodiment according to the invention.

In this embodiment, as shown in FIG. 10, a load voltage of potential $V_{sc}$ is applied to a TFT side conductive light shielding film 116, and an off-set voltage of potential $V_{com}$ is applied to the opposing electrode 121. Thus, by the potential differences between the gate electrode 111 and the pixel electrode 105, and between the drain electrode 113 and the pixel electrode 105, the vertical field components (B in FIG. 10) between the pixel electrode 105 and the opposing electrode 121 are relatively increased with respect to the lateral fields (A in FIG. 10) that are generated at the liquid crystal layer around the pixel, thus reducing the reverse tilt of the liquid crystal.

Figure 11:
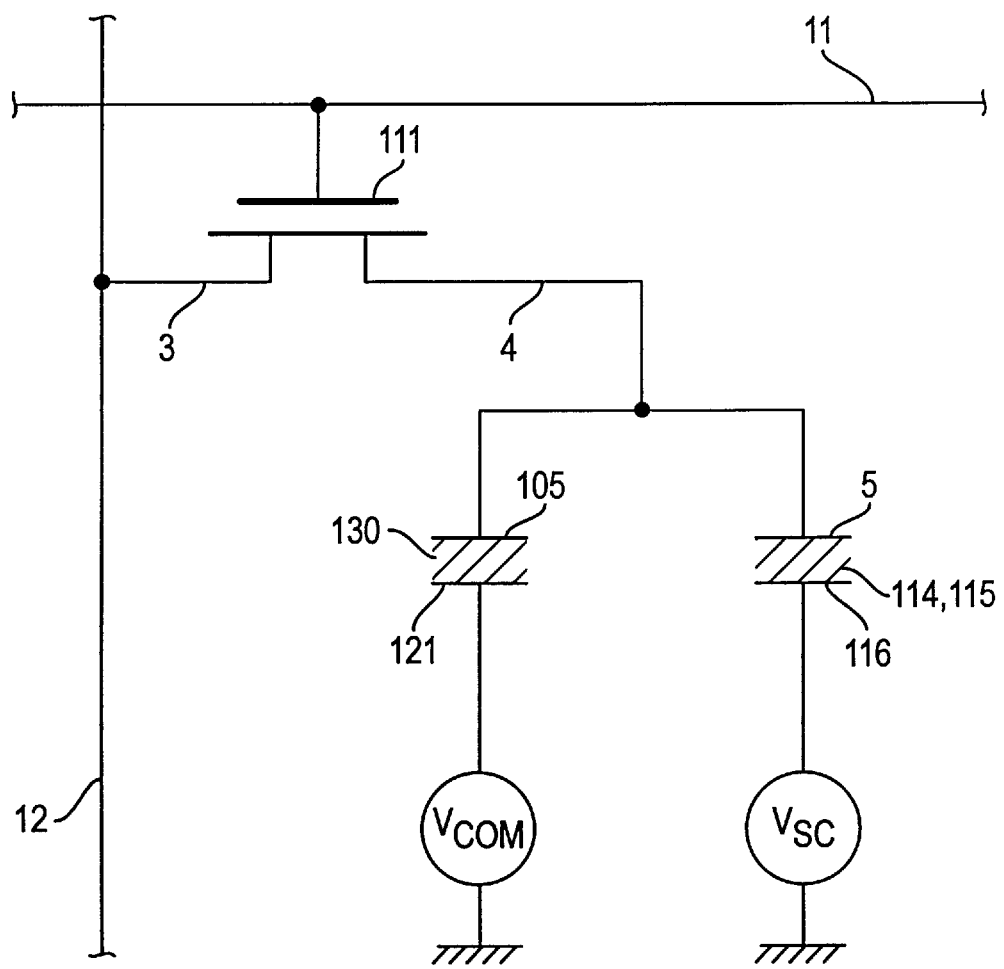
FIG. 11 is an equivalent circuit diagram of the unit pixel of the first embodiment according to the invention.

FIG. 11 shows an equivalent circuit of one pixel in this embodiment. As shown therein, there is a TFT side conductive light shielding film 116 which, together with the pixel electrode 5, forms a capacitor by sandwiching between them a gate insulating film 115 and a TFT light shielding layer insulating film 114. The potential $V_{sc}$ is applied to the TFT side conductive light shielding film 116 separately from a potential applied to the opposing electrode 121.

Figure 12:
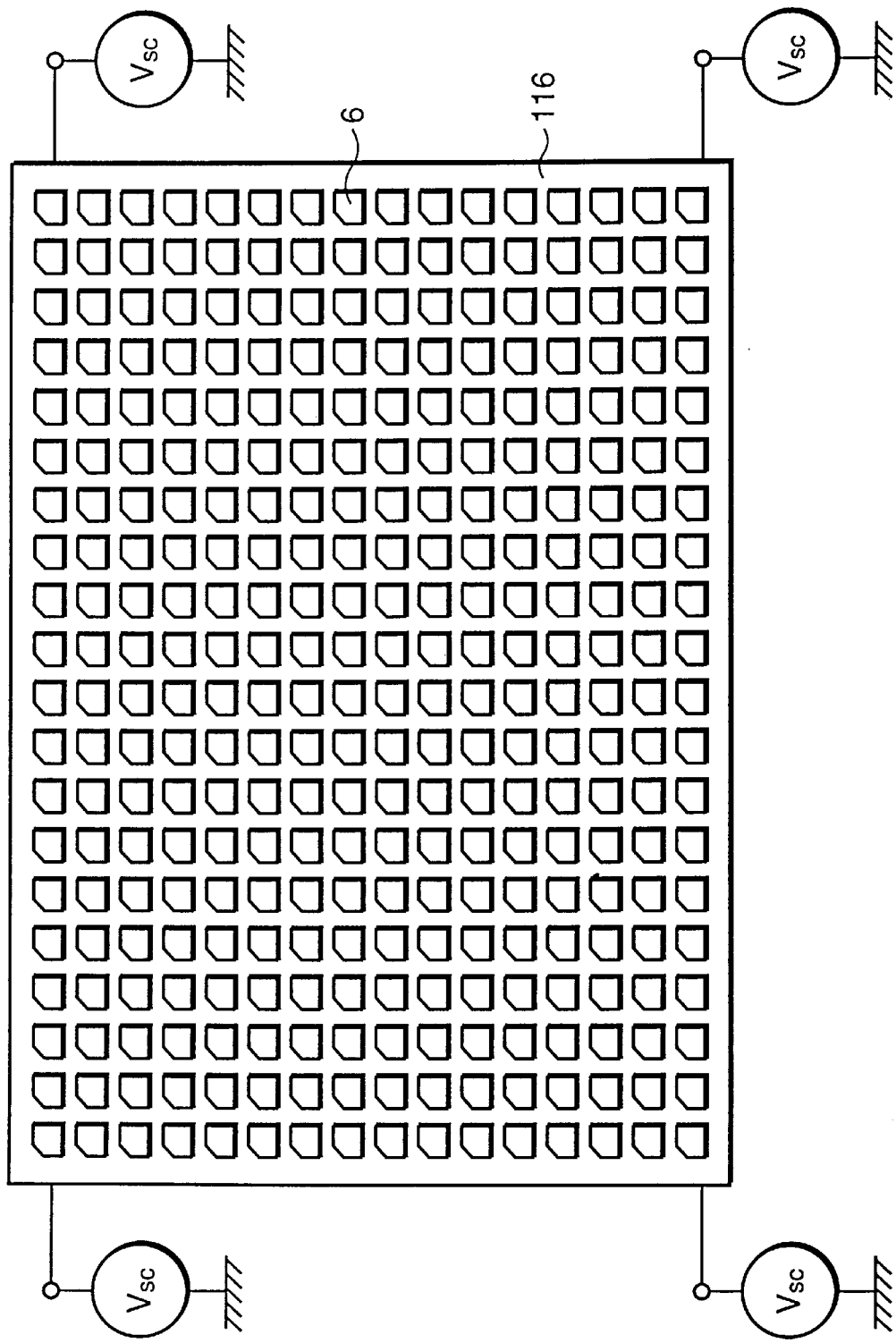
FIG. 12 is a diagram for showing locations of power supply terminals and a TFT side light shielding film layer in the structure of the first embodiment according to the invention.

The TFT side conductive light shielding film 116 is, as shown in FIG. 12, a continuous flat plate. Power supply terminals are provided respectively at four corners, so that there is no lowering of the aperture efficiency caused by wiring of the power supply lines.

Figure 13:
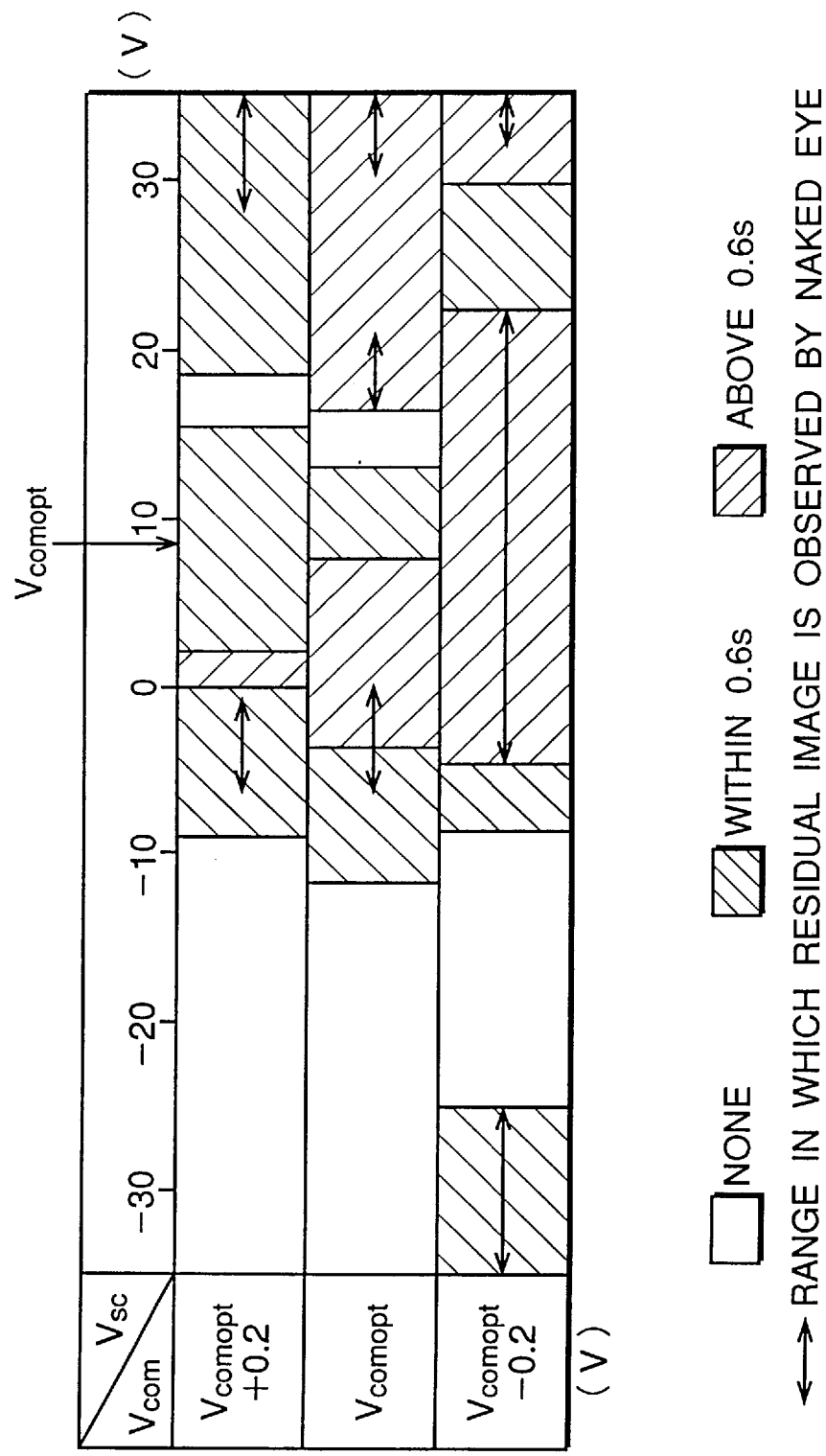
FIG. 13 is a diagram which is used for showing test results of the structure of the first embodiment and which shows the time periods in which the disclination was present in an open portion within the pixel.
Figure 14:
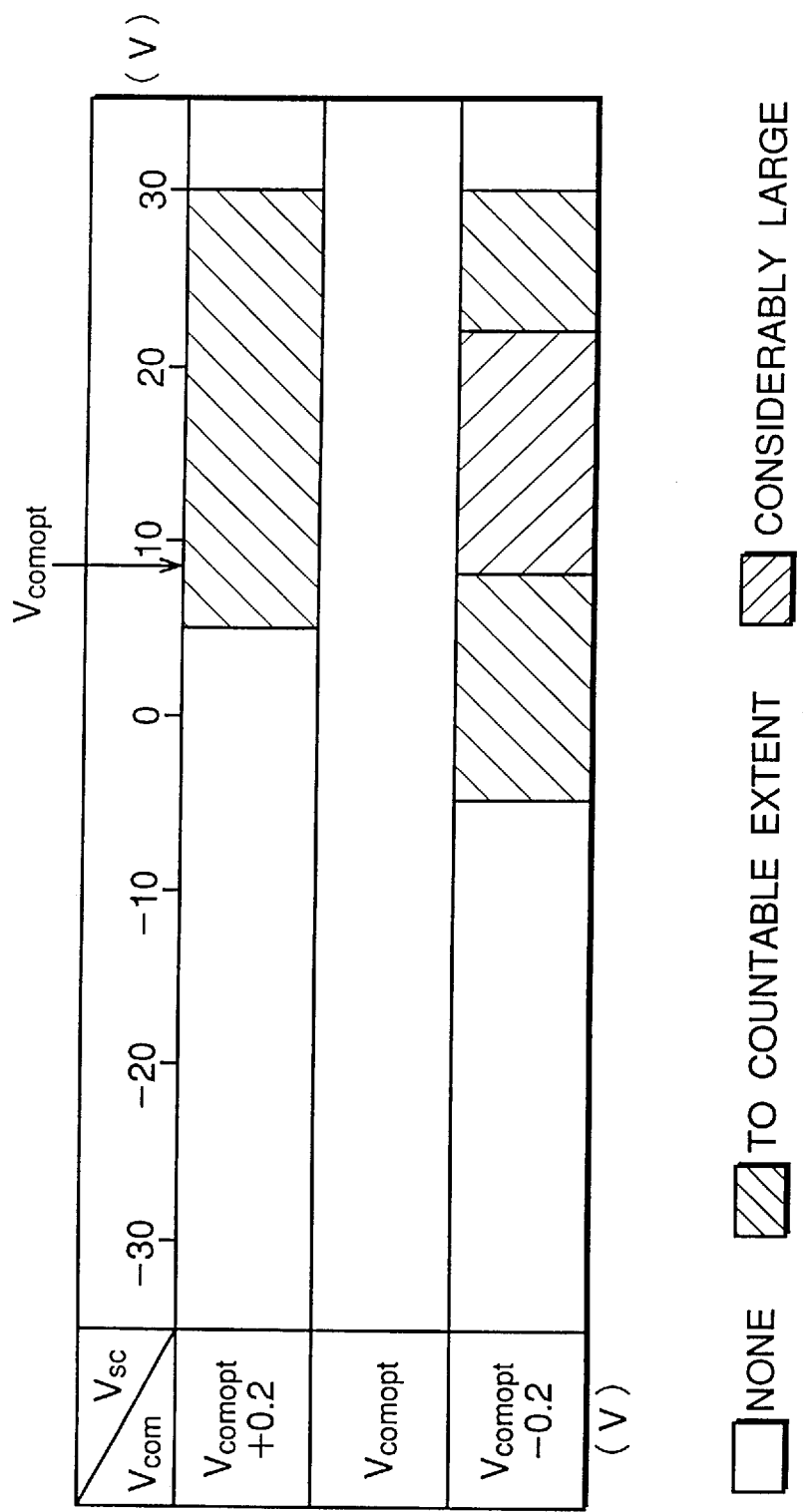
FIG. 14 is a diagram which is used for showing test results of the structure of the first embodiment and which shows the frequencies in which the disclination stands in the open portion within the pixel.
Figure 15:
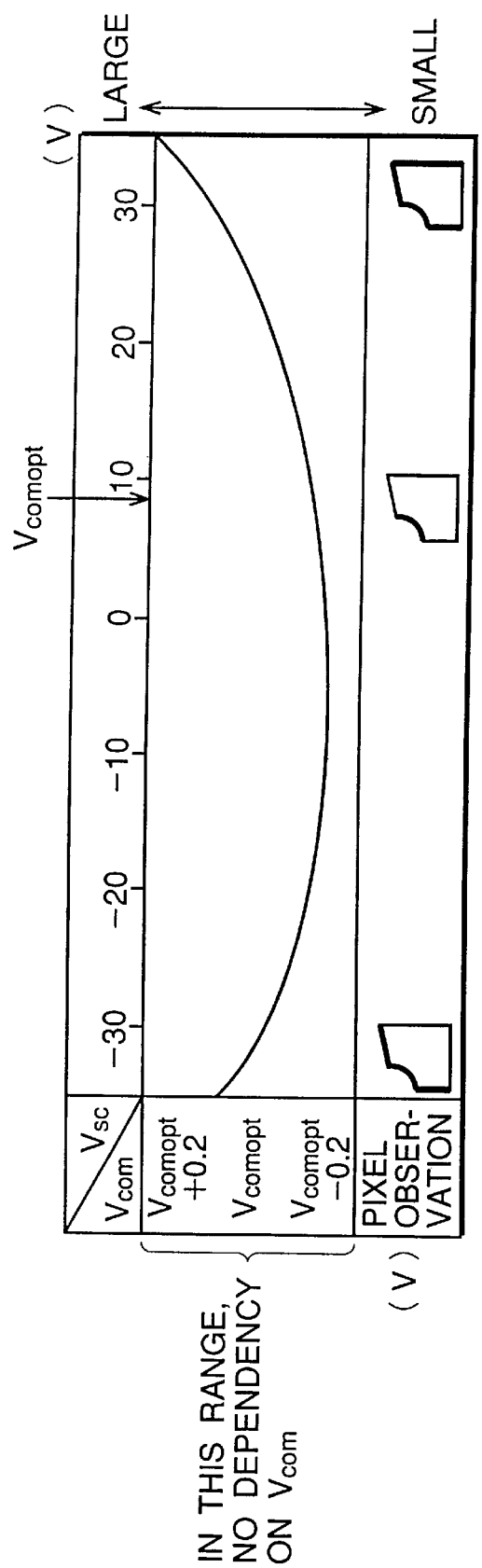
FIG. 15 is a sensory gathered diagram for showing a clear line area observed around the pixel.

Test results, as examples, are shown in FIGS. 13–15 which show the correlation of the voltage ($V_{sc}$) of the TFT side conductive light shielding film 116 and the voltage ($V_{com}$) of the opposing electrode 121 with respect to the disclination. FIG. 13 shows periods of time in which the disclination exists in open portions within the pixels, FIG. 14 shows frequencies in which the disclination stands in the open portion within the pixel, and FIG. 15 shows, in a sensory gathered diagram, a clear line area observed around the pixel. In these figures, $V_{comopt}$ represents an opposing electrode voltage value at which flickering during the half-tone display becomes a minimum, that is, the DC component within the cell becomes a minimum. Normally, the opposing electrode voltage is set to the $V_{comopt}$.

However, the $V_{comopt}$ value varies depending on the cell thickness, gate voltage and the drain voltage that are set, so that it is different depending on a panel. Thus, in this embodiment, the variations in the $V_{comopt}$ value of ±0.2 V are taken into account.

FIG. 13 shows the time periods measured from the time when the pixel is changed from its white display to its black display to the time when the disclination extinguishes from within the open portion of the pixel.

In the prior art devices, both the $V_{sc}$ and the $V_{com}$ are set to $V_{comopt}$, and it can be appreciated from the test data that the time period for the standing disclination within the pixel is longer. Also, as the $V_{com}$ is slightly lowered from $V_{comopt}$, the time period for the standing disclination within the pixel becomes longer.

In this embodiment, it can be appreciated that, by setting $V_{sc}$ to a voltage about 15 to 25 V lower than $V_{comopt}$ (about 8 V), it is possible to suppress the entering of the disclination into the pixel.

FIG. 14 shows the frequencies (number of pixels) of the standing disclination at the open portion in the pixel, and the number of pixels which are gathered from a sensory decision and in which the disclination having entered into the open portion in the pixel are present there without being extinguished.

As seen in FIG. 14, when $V_{com}=V_{comopt}$, the standing type disclination is almost none. However, once the $V_{com}$ changes slightly from the $V_{comopt}$, the standing disclination occurs. In the example shown, this phenomenon does not arise when the $V_{sc}$ value is $(V_{comopt}-15)$ V or below.

FIG. 15 is a sensory gathered diagram showing the area of the clear lines which do not move within the pixel but appear around the open portion of the pixel. These clear lines are generated uniformly in the entire pixels.

It can be appreciated from FIG. 15 that, if the $V_{sc}$ is changed when the $V_{com}$ is close to the $V_{comopt}$, the clear line area becomes larger with an increase in $|V_{sc}|$. In this example, this is distinct when $V_{sc}>(V_{comopt}+10)$ V, $V_{sc}<(V_{comopt}-30)$ V.

In this embodiment, when judged totally from the test results given in FIGS. 13–15, it is considered that, when the $V_{sc}$ is set to a level about 15 V to 20 V lower than the $V_{comopt}$, the disclination is suppressed thus improving the display. Also, even when the $V_{com}$ is minutely deviated from the $V_{comopt}$, the occurrence of the disclination is unlikely so that the quality of display is stabilized.

Figure 16:
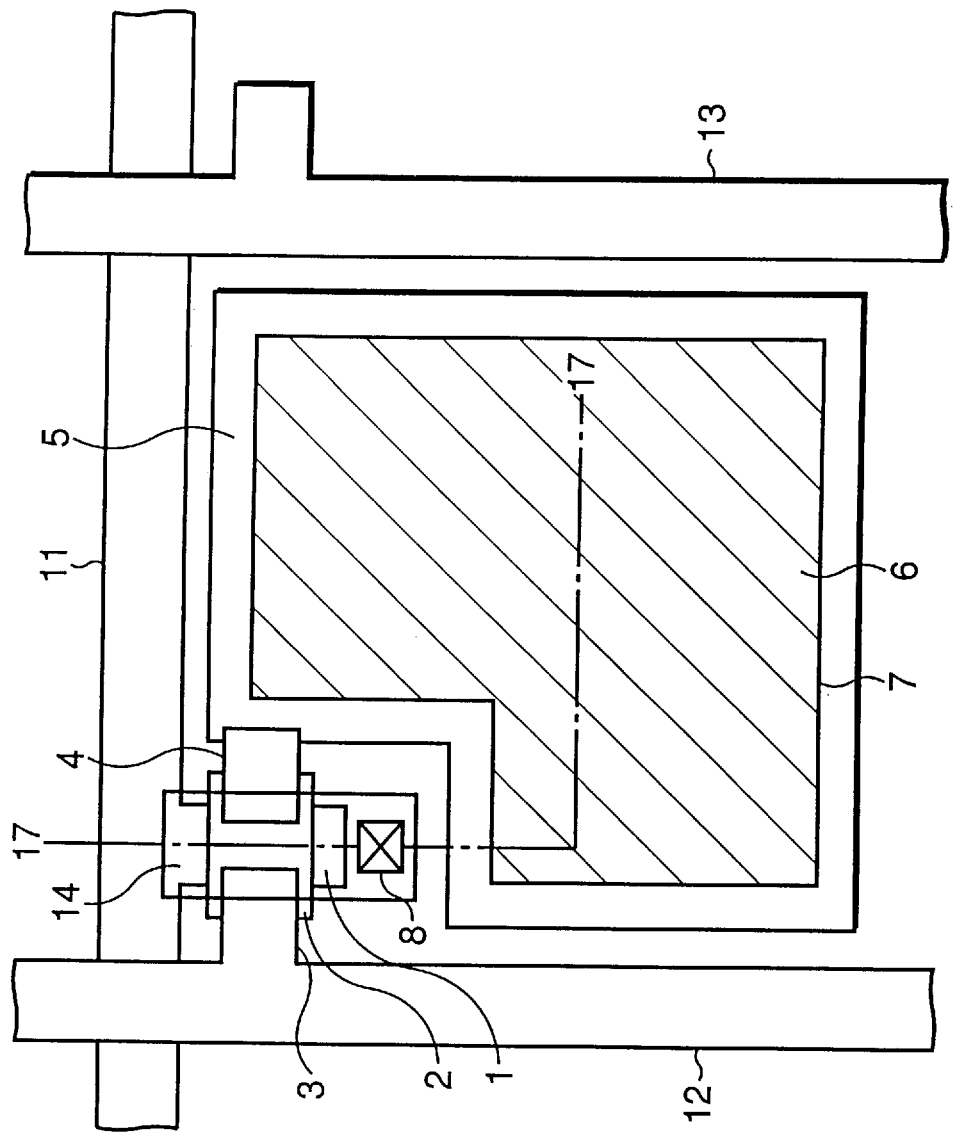
FIG. 16 is a plan view of a unit pixel of a second embodiment according to the invention.
Figure 17:
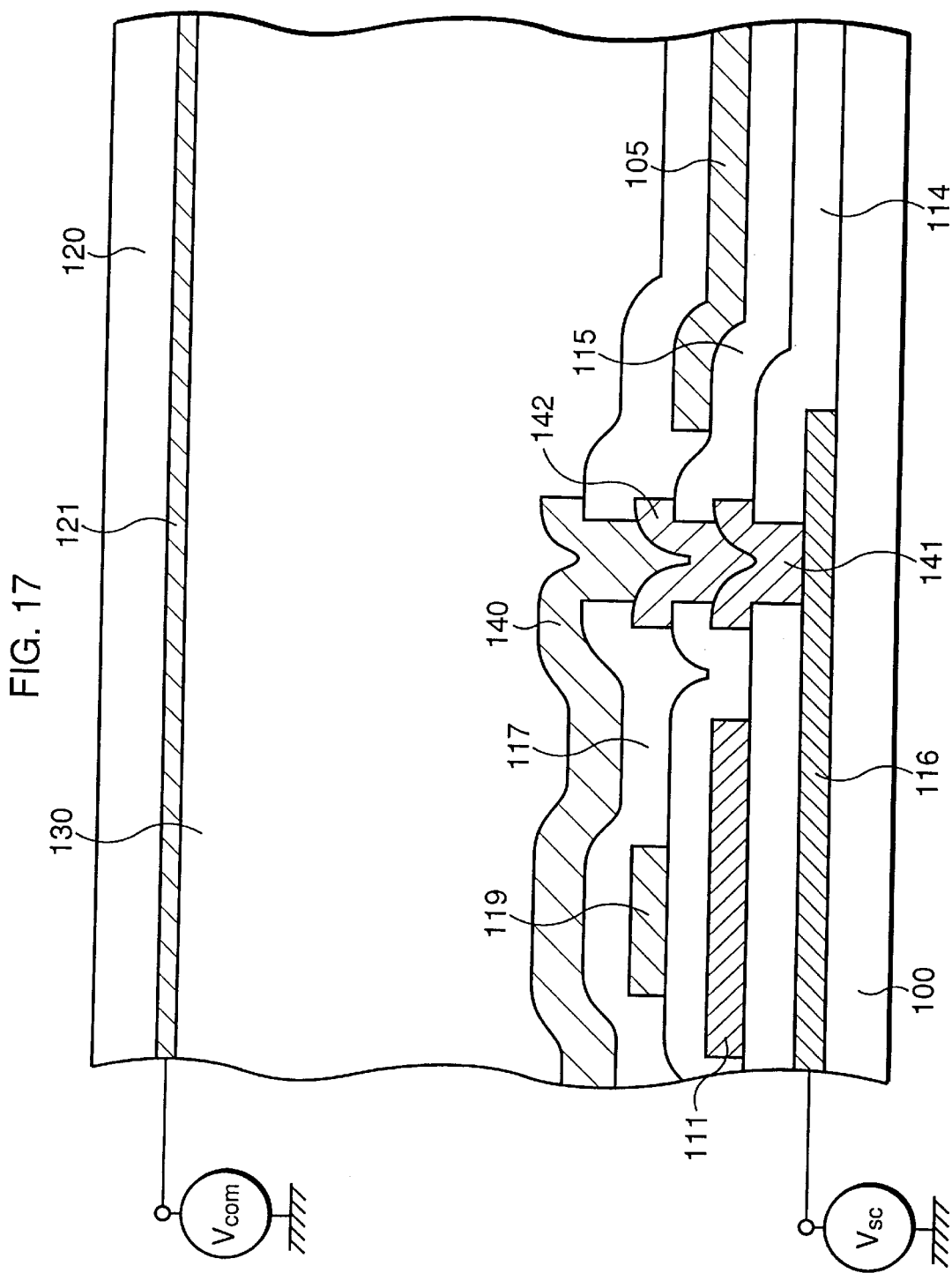
FIG. 17 is a sectional view of the unit pixel, taken along line 17—17 in FIG. 16.

FIGS. 16 and 17 show a unit pixel in a liquid crystal display device of a second embodiment according to the invention, FIG. 16 showing a plan view thereof, and FIG. 17 showing a sectional view taken along line 17—17 in FIG. 16.

In FIG. 16, the numeral 1 is for a gate electrode, 2 is for a semiconductor film, 3 is for a drain electrode, 4 is for a source electrode, 5 is for a pixel electrode, 6 is for an open portion, 7 is for an end of a TFT side conductive light shielding film, 8 is for a TFT back channel side light shielding film contact portion, 11 is for a scanning signal line, 12 and 13 are for image signal lines, and 14 is for a back channel protective light shielding film.

As shown in FIG. 17, a Cr film is deposited on a glass substrate 100 by a sputtering process, and an opening is formed by etching selectively the portion of the Cr film that corresponds to a display electrode formation region, whereby a TFT side conductive light shielding film 116 is formed. Then, on the surface that includes the TFT side conductive light shielding film 116, a nitride silicon film is deposited by a CVD process, thus forming a TFT light shielding layer insulating film 114.

After forming an opening by etching selectively the portion of the nitride silicon film that corresponds to a contact hole, a Cr film is deposited on the TFT light shielding layer insulating film 114 whereby a gate electrode 111 and a gate contact 141 are formed.

A gate insulating film 115 is formed by depositing a nitride silicon film by a CVD process. Thereafter, on the gate insulating film 115 corresponding to the gate electrode 111, an amorphous silicon film 119 and the $n^+$ type amorphous silicon layer provided on a surface of the amorphous silicon film are selectively formed and, on the gate insulating film 115 on the open portion of the light shielding film 116, an ITO film is selectively provided and the pixel electrode 105 is formed. Here, the pixel electrode 105 is formed so as to be partly overlapped by a periphery of the open portion of the TFT side conductive light shielding film 116.

Next, the portion of the gate insulating film 115 that corresponds to the contact hole is selectively etched.

Figure 2:
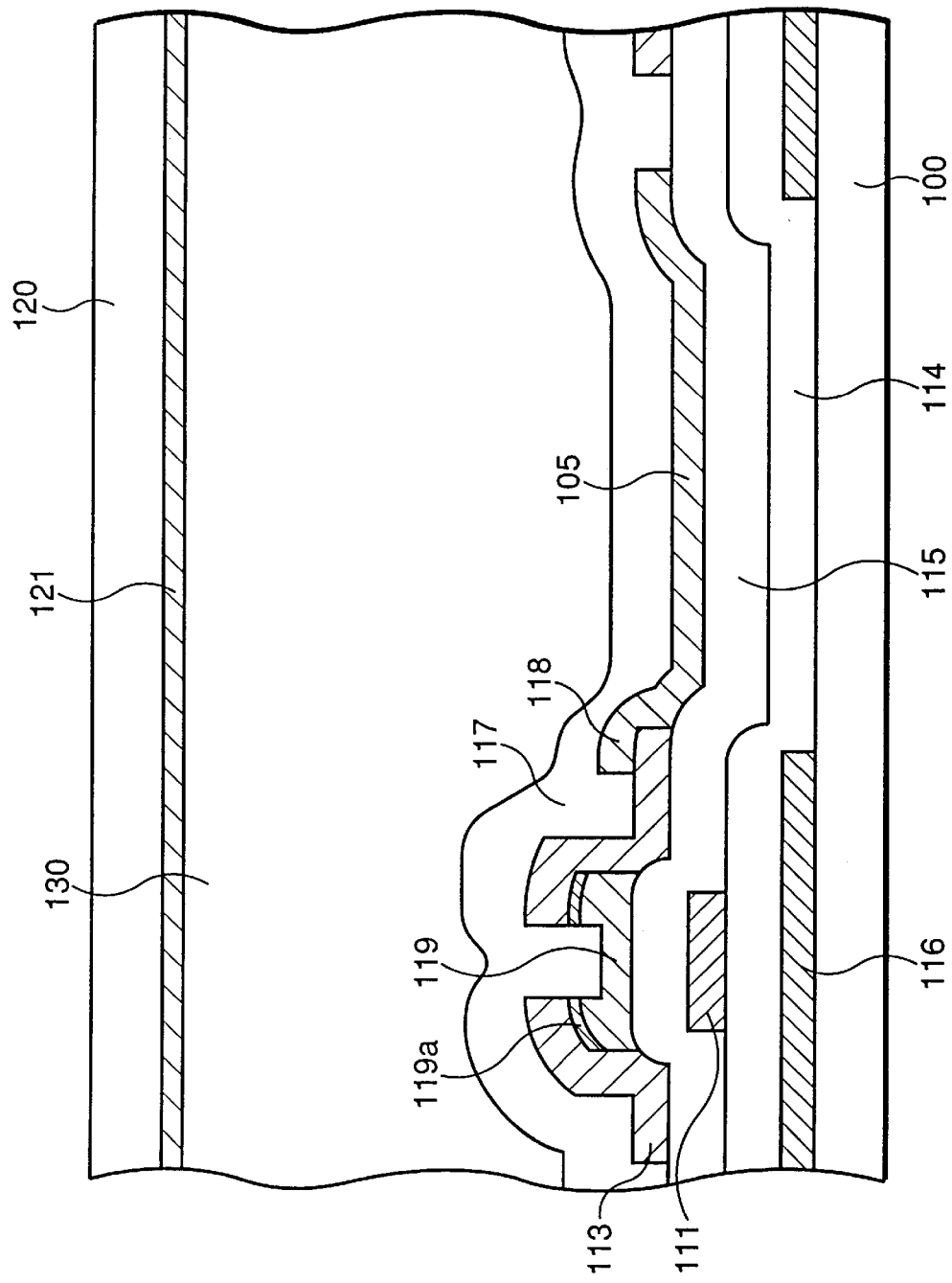
FIG. 2 is a sectional view of the prior art unit pixel, taken along line 2—2 in FIG. 1.
Figure 3:
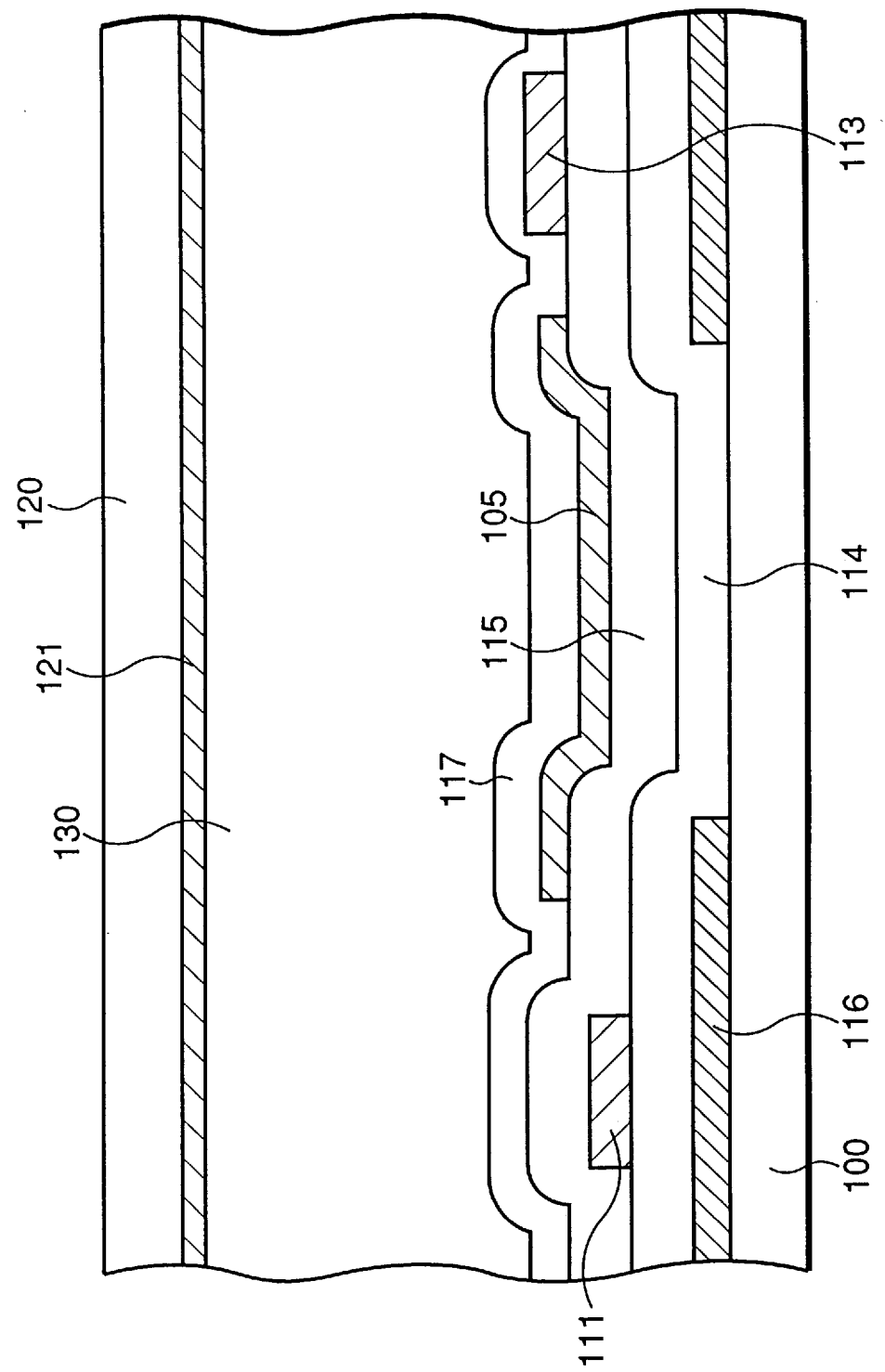
FIG. 3 is a sectional view of the prior art unit pixel, taken along line 3—3 in FIG. 1.
Figure 4:
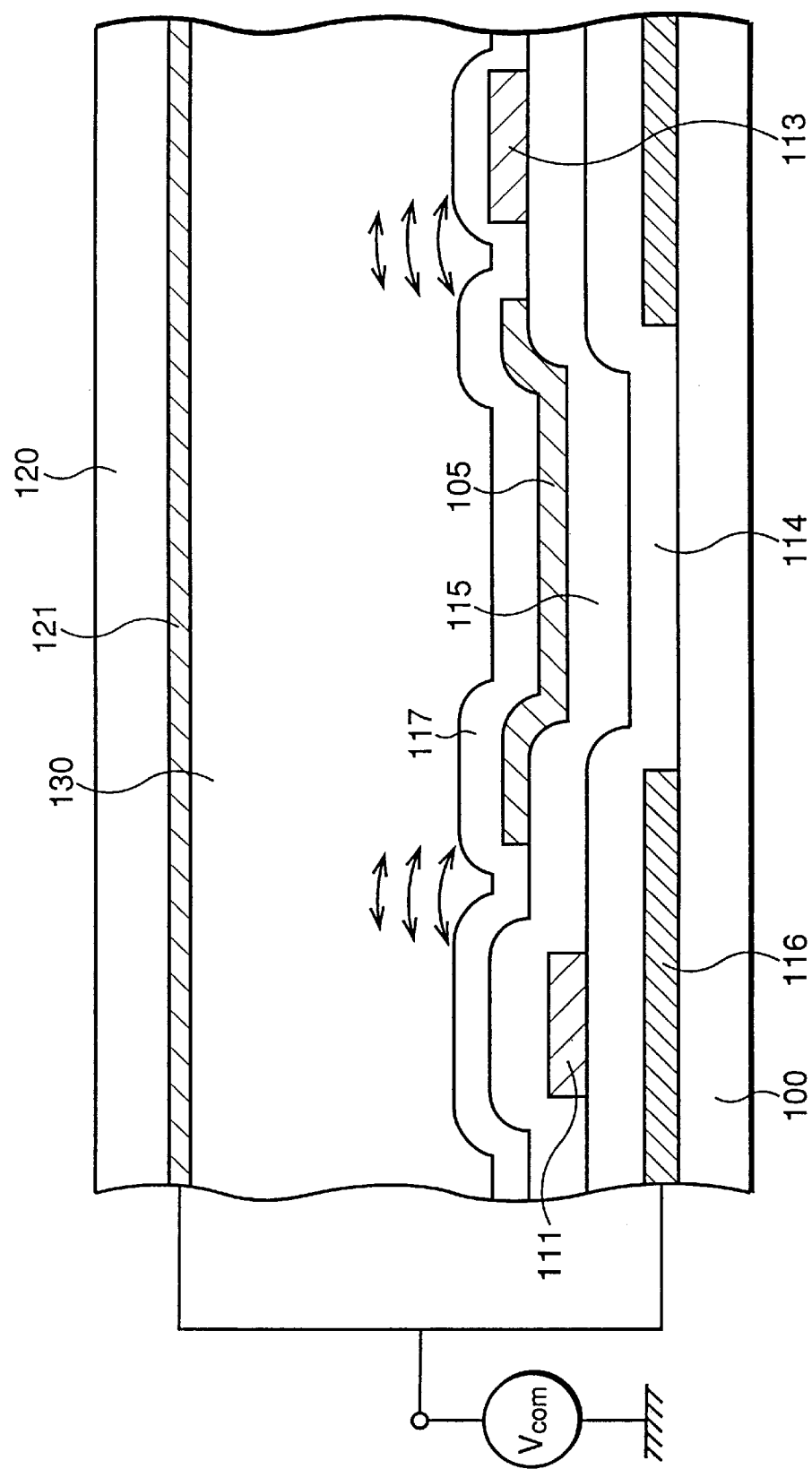
FIG. 4 is a sectional view of the prior art unit pixel for use in explaining the structure of the liquid crystal display element.
Figure 5:
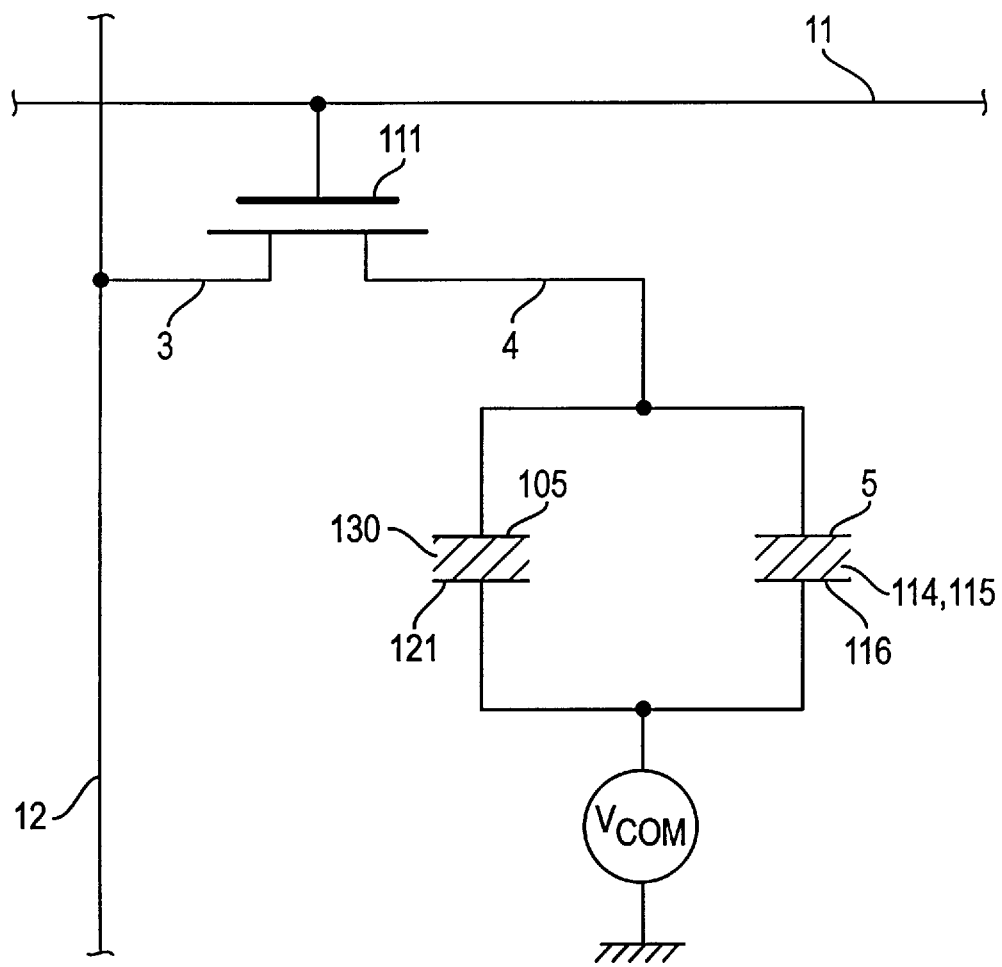
FIG. 5 is an equivalent circuit diagram of the prior art unit pixel in FIG. 1.
Figure 6:
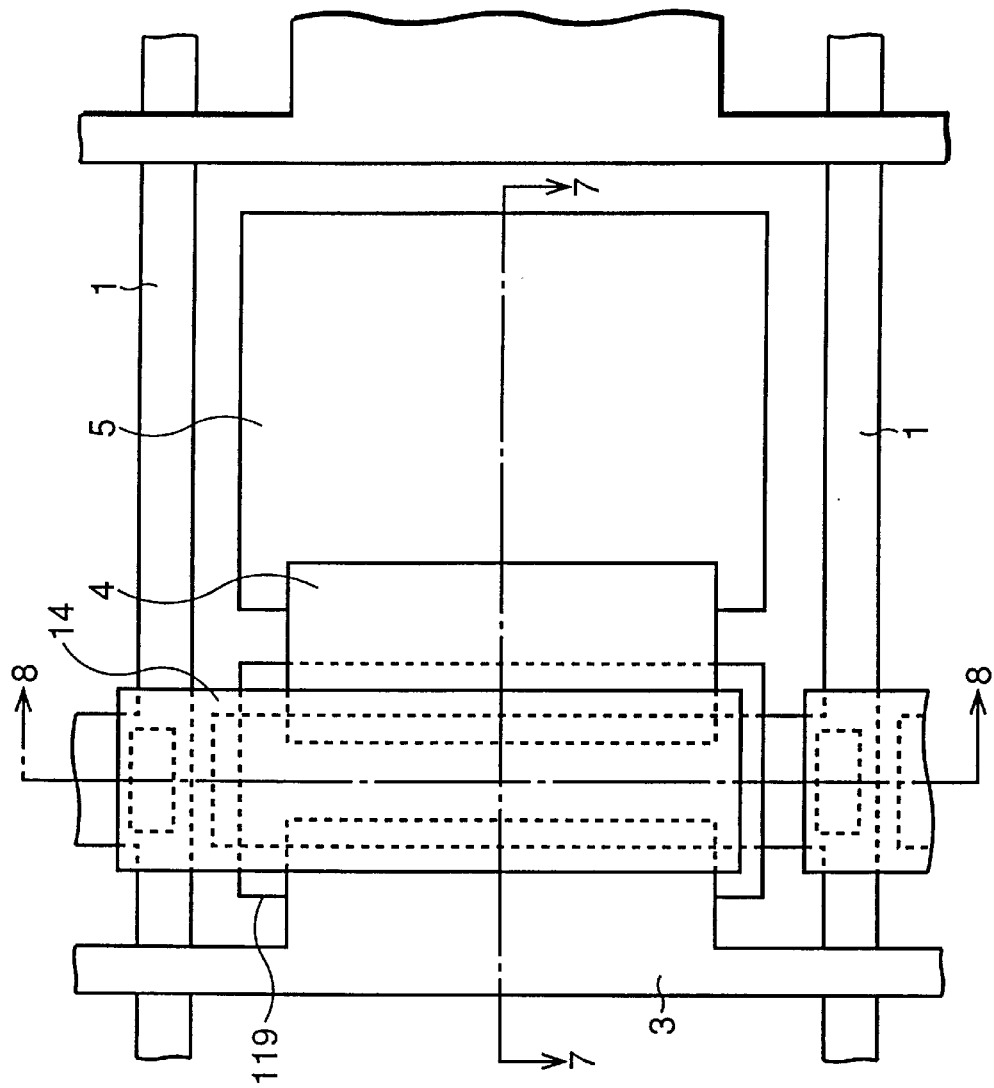
FIG. 6 is a plan view of a prior art unit pixel disclosed in Japanese Patent Application Kokai Publication No. Sho 60-192370.
Figure 7:
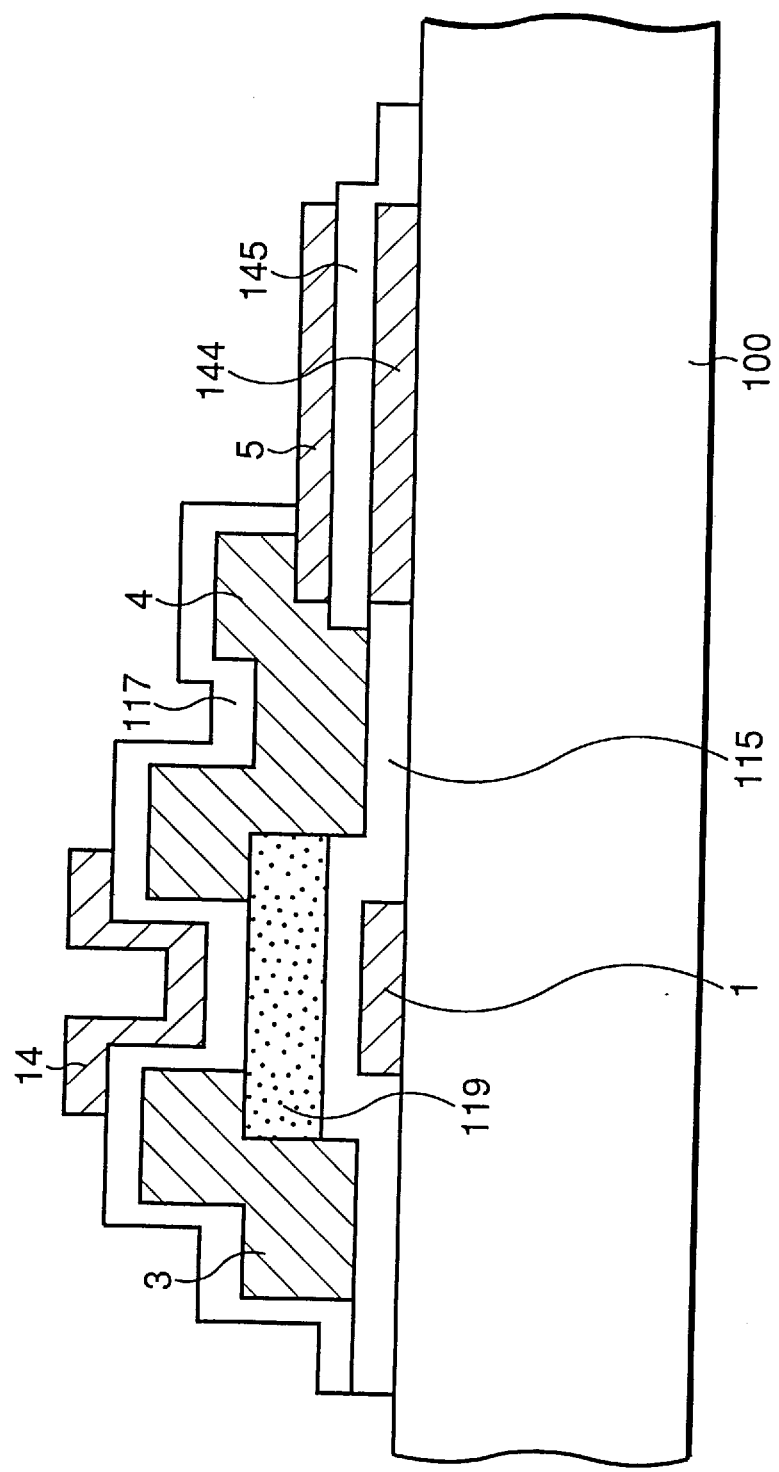
FIG. 7 is a sectional view of the prior art unit pixel, taken along line 7—7 in FIG. 6.
Figure 8:
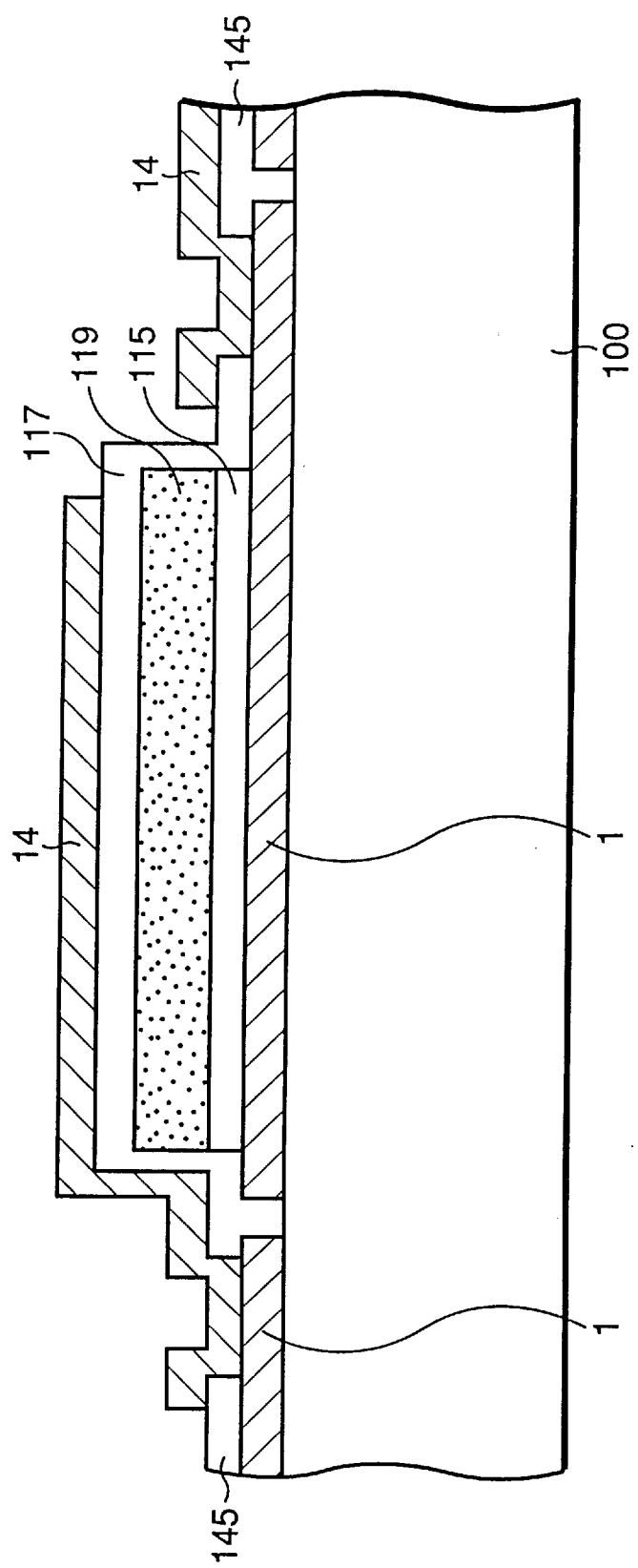
FIG. 8 is a sectional view of the prior art unit pixel, taken along line 8—8 in FIG. 6.
Figure 9:
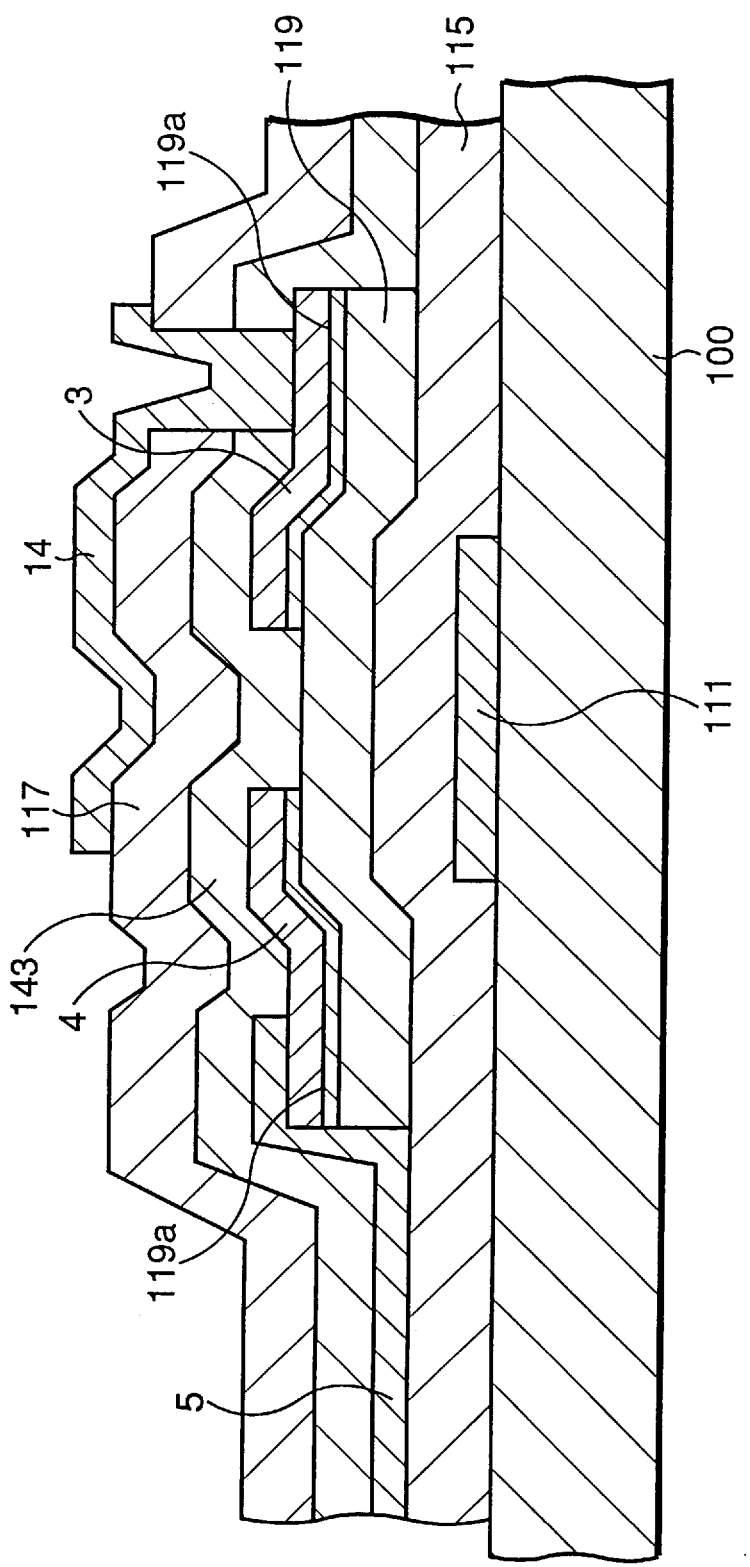
FIG. 9 is a sectional view of a prior art liquid crystal display element structure disclosed in Japanese Utility Model Application Kokai Publication No. Hei 3-42124.

A Cr film is deposited on the surface including the amorphous silicon film 119, and this is selectively etched so as to form a drain electrode 113, a source electrode 118 (as shown, for example, in the FIG. 2 sectional view), and a drain contact 142.

Using source/drain electrodes 118 and 113 as masks, the $n^+$ type amorphous silicon layer 119a (as shown, for example in FIG. 2 sectional view) at a region corresponding to the gate electrode 111 is removed.

Next, a nitride silicon film is deposited by a CVD process, and a passivation film 117 is formed.

Then, the portion corresponding to the contact hole is selectively etched. Subsequently, Cr is deposited on the passivation film 117, and is selectively etched so as to form a TFT back channel side conductive light shielding film 140, thus completing a thin film transistor array substrate of this embodiment.

The potential of the TFT back channel side conductive light shielding film 140 becomes the same potential as that of the TFT side conductive light shielding film 116 and can be set selectively as desired. Thus, the TFT back channel side conductive light shielding film 140 functions as a stable back gate electrode. Unlike in the prior art, this back gate (numeral 14 in FIG. 16) is electrically independent from the gate line and the drain line, so that it is possible to provide thereto any desired potential stably.

When a minus voltage is applied to the back gate, it is possible to suppress, in addition to the disclination explained with respect to the first embodiment, the occurrence of the leakage current during the off-state of the TFT.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An active matrix type liquid crystal display device having a plurality of liquid crystal elements, each of said liquid crystal elements comprising:

a transistor section having a gate electrode, a gate insulating film, a semiconductor film, a source electrode, a drain electrode, and a passivation insulating film;

a first conductive light shielding film electrically coupled to said transistor section and having an open portion;

a pixel electrode formed over said open portion of said first conductive light shielding film and electrically connected to said source electrode of said transistor section;

a liquid crystal layer formed on said passivation insulating film;

an opposing electrode formed on said liquid crystal layer; and a means to apply to said first conductive light shielding film a potential independent of a potential applied to said opposing electrode wherein, during operation of said first conductive light shielding film, a voltage of said first conductive light shielding film is capable of being different from a voltage of said opposing electrode, thereby, reducing disclination in said liquid crystal elements.

2. The active matrix type liquid crystal display device according to claim 1, in which said means to apply a potential comprises a first potential terminal connected to said opposing electrode and a second potential terminal connected to said first conductive light shielding film.

3. The active matrix type liquid crystal display device according to claim 1, wherein a load voltage applied to said first conductive light shielding film is several tens of volts lower than an off-set voltage applied to said opposing electrode.

4. The active matrix type liquid crystal display device according to claim 3, which further comprises a second conductive light shielding film disposed on said passivation insulating film on a back channel at said transistor section, and a contact hole provided in an insulating film layer disposed on said first conductive light shielding film, said second conductive light shielding film and said first conductive light shielding film being electrically interconnected through said contact hole.

* * * * *